United States Patent
Voss

(10) Patent No.: US 6,526,084 B1
(45) Date of Patent: Feb. 25, 2003

(54) DETECTION OF $F_2$-CONCENTRATION FOR POWER STABILIZATION OF AN $F_2$-157 NM EXCIMER LASER BY USING RED LASER EMISSION OF F-ATOM

(75) Inventor: Frank Voss, Bad Gandersheim (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/499,907

(22) Filed: Feb. 8, 2000

Related U.S. Application Data

(60) Provisional application No. 60/124,780, filed on Mar. 17, 1999.
(51) Int. Cl.[7] .............................................. H01S 3/223
(52) U.S. Cl. ............................ 372/57; 372/55; 372/61; 372/59; 372/58; 372/22
(58) Field of Search .............................. 372/57, 58, 55, 372/61, 59, 22

(56) References Cited

U.S. PATENT DOCUMENTS 6,243,406 B1 * 6/2001 Heist et al. .................... 372/57
6,330,260 B1 * 12/2001 Onkels et al. ............. 372/38.04

* cited by examiner

*Primary Examiner*—Paul Ip
*Assistant Examiner*—Delma R. Flores-Ruiz
(74) *Attorney, Agent, or Firm*—Sierra Patent Group, Ltd.; Andrew V. Smith

(57) ABSTRACT

An efficient and practical means and method is provided for monitoring the $F_2$ concentration in an $F_2$ excimer laser. The $F_2$ concentration is monitored by measuring the concentration F atoms and more specifically by measuring the amount of red laser light emitted during discharge. The amount of red laser light emitted during discharge is a function of the concentration of F atoms because such red laser light is emitted by excited F atoms. There is also a relationship between the concentration of F atoms and the concentration of molecular $F_2$ in the discharge chamber. Accordingly, the concentration of $F_2$ gas may be monitored by measuring the amount of red laser light emitted during discharge.

10 Claims, 2 Drawing Sheets

DETECTION OF F₂-CONCENTRATION FOR POWER STABILIZATION OF AN F₂-157 NM EXCIMER LASER BY USING RED LASER EMISSION OF F-ATOM

PRIORITY

This Application claims the benefit of U.S. Provisional Application No. 60/124,780, which provisional application was filed Mar. 17, 1999 and is hereby incorporated by reference in its entirety.

RELATED U.S. APPLICATIONS

The subject matter of this Application is related in part to that of the following two U.S. patent applications: Ser. No. 09/418,052, filed Oct. 14, 1999; and Ser. No. 09/447,882, filed Nov. 23, 1999. Said applications relate generally to the problem of maintaining an optimal gas mixture in a gas discharge laser and are hereby incorporated by reference in their entireties.

FIELD OF THE INVENTION

The invention relates to a means and method of monitoring the concentration of $F_2$ gas in a molecular fluorine laser. Knowledge of the $F_2$ concentration facilitates the maintenance of an optimal gas mixture in the discharge chamber of the laser.

BACKGROUND OF THE INVENTION

Gas discharge lasers are well known as valuable tools for many industrial applications. In such lasers a mixture of gases in a discharge chamber is excited by an electrical power source to generate laser radiation. The mixture of gases may commonly include a halogen gas. The gain and thus the output of the laser is related to the composition of the chamber gas mixture and to the purity of the mixture. When the laser is operating, there is a tendency for halogen gas present in the mixture to react with other materials in the discharge chamber. In turn these reactions cause a depletion of the halogen and a reduction in the gain of the laser.

On the other hand, in industrial applications there is a great desire to have precise control and simultaneous stabilization of many laser parameters over extended periods of operation, especially with regard to excimer laser applications in microphotolithography. The amount of "up time" of a laser, or time when the laser is in operation and being used for industrial application, is a key variable in operational cost considerations. It is desired to be able to successively adjust, sensitively control and carefully stabilize various laser parameters efficiently and simultaneously. The type and quality of the gas discharge affects many significant laser parameters such as output power, energy stability, efficiency, bandwidth, long and short axial beam profiles, temporal and spatial pulse width, and beam divergence. The quality of the gas discharge depends on such factors as the composition of the gas mixture in the discharge chamber, the quality of preionization used, properties of the discharge circuit, and profiles of the electrodes used. See R. S. Taylor, Appl. Phys. B41, 1–24 (1986). Decomposition and contamination of the gas mixture and the design of the gas exchange system (e.g., flow speed) also strongly determine the limits of achievable laser parameters. A fast gas exchange between electrodes may be realized by using a laser discharge chamber design including fast blower gas circulation. Cryogenic and electrostatic equipment and techniques may be used for additional gas purification. See German Patent No. 32 12 928.

Optimal gas mixtures for various gas discharge lasers are generally known. A partition of $F_2$ and buffer gas having a ratio of partial pressures of 0.3–2.5 for $F_2$ to 1000 for the buffer gas is thought to be substantially optimal for an $F_2$ excimer laser. The buffer gas is typically Helium or Neon, or a mixture thereof. As noted above, when a gas discharge laser containing a halogen gas is operated, over time the gas mixture continuously degrades or "ages" because of chemical reactions between the halogen and other materials including metal dust. In the case of an $F_2$ excimer laser this means that there is a consumption of $F_2$ over time when the laser is operated. U.S. Pat. No. 4,977,573 to Bittenson et al., which is assigned to the same assignee as the present application, relates to this problem of halogen consumption and is incorporated herein by reference in its entirety.

In order to maintain the laser's operating characteristics, from time to time it is necessary to replenish the halogen gas in some way so as to substantially restore the original partition of the gas mixture.

It is desirable to have suitable measuring tools that indicate when and to what extent the laser gas mixture is aged before problems appear. It is further desirable to avoid significant reductions in laser output performance, processing errors, and excessive laser downtime.

A mass spectrometer may be used for precise analysis of the composition of the gas mixture. See U.S. Pat. No. 5,090,020 to Bedwell. However, a mass spectrometer is an undesirably heavy and costly piece of equipment to incorporate into a continuously operating excimer or molecular laser system. Other ways of monitoring the status of a laser gas mixture include measuring a spectrum width or bandwidth of a laser emission (see U.S. Pat. No. 5,450,436 to Mizoguchi et al.), measuring a beam profile of the laser emission (see U.S. Pat. No. 5,642,374 to Wakabayashi et al.), and measuring other characteristics such as the width of the discharge or temporal pulse width of the output beam wherein a rough estimate of the status of the gas mixture may be made. See U.S. Pat. No. 5,440,578 to Sandstrom. Another known technique of measuring the age of the laser gas mixture is to count the total number of laser pulses from the most recent new fill of the discharge chamber. See U.S. Pat. No. 5,646,954 to Das et al. A number of techniques are known wherein the output beam energy or efficiency is monitored and steps are taken to maintain the output beam at an optimal energy. See U.S. Pat. Nos. 3,899,750 to Hochuli, U.S. Pat. No. 4,429,392 to Yoshida et al., and U.S. Pat. No. 4,977,573 to Bittenson et al. Similarly see Mieko Okiwa and Minora Obara, Applied Physics Letters S1, (13), Sep. 28, 1987, and I. G. Koprinkov, K. V. Stamenov, and K. A. Stankov, Applied Phys. B33, 23.5–2.38 (1984). These articles teach the application of $F_2$-injections based on measurement of an applied high voltage. Again, such methods do not rely on any knowledge of the actual $F_2$/F-concentration in the gas discharge chamber of the excimer laser.

Rare and halogen gas concentrations have also been maintained by using a complex series of chemical reactions to determine the gas mixture concentrations and replenish depleted gases as needed. See U.S. Pat. No. 4,740,982 to Hakuta et al.

It is desirable then to have an efficient, practical, and inexpensive technique for monitoring the gas mixture status without variations in other parameters affecting the analysis.

SUMMARY OF THE INVENTION

It is an object of the present invention to provide an efficient and practical means and method for monitoring the $F_2$ concentration in an $F_2$ excimer laser. The present invention monitors the $F_2$ concentration by measuring the concentration of F atoms and more specifically by measuring the amount of red laser light emitted during discharge. The amount of red laser light emitted during discharge is a function of the concentration of F atoms because such red laser light is emitted by excited F atoms. There is also a relationship between the concentration of F atoms and the concentration of molecular $F_2$ in the discharge chamber. Accordingly, it is possible to monitor the concentration of $F_2$ gas by monitoring the amount of red laser light emitted during discharge.

DETAILED DESCRIPTION OF THE INVENTION

The red laser light of the 157 nm $F_2$ excimer laser (which light appears around 635 nm, 745 nm, and 755 nm in the "red" visible region of the spectrum) is used for detecting the $F_2$-concentration in an $F_2$He or $F_2$/He/Ne discharge mixture in order to determine an appropriate time for a halogen injection. Such red visible laser light from a $F_2$-laser is emitted by excited F-atoms as compared to the 157 nm output of the excited $F_2$ molecules. The decrease in $F_2$-gas in a gas discharge chamber after a number of laser pulses also results in a decrease in the concentration of F-atoms. So the red laser emission signal of a photo detection system provides information about the F and $F_2$ concentrations. By monitoring the red laser emission the appropriate point in time to provide an $F_2$-gas injection may be determined. An advantage of this approach is that it avoids $F_2$ overfill. It is possible to calibrate the photo detection system to the partial pressure of $F_2$. Accordingly, halogen injection to the 157 nm-$F_2$-laser may be timed to occur only when the $F_2$ drops below a certain level, preventing any overfill. Other advantages of monitoring the red light emission of the $F_2$-laser include the fact that such red light transmits readily through air and that the intensity of such red light can be measured without using an expensive detector.

Figure 1:
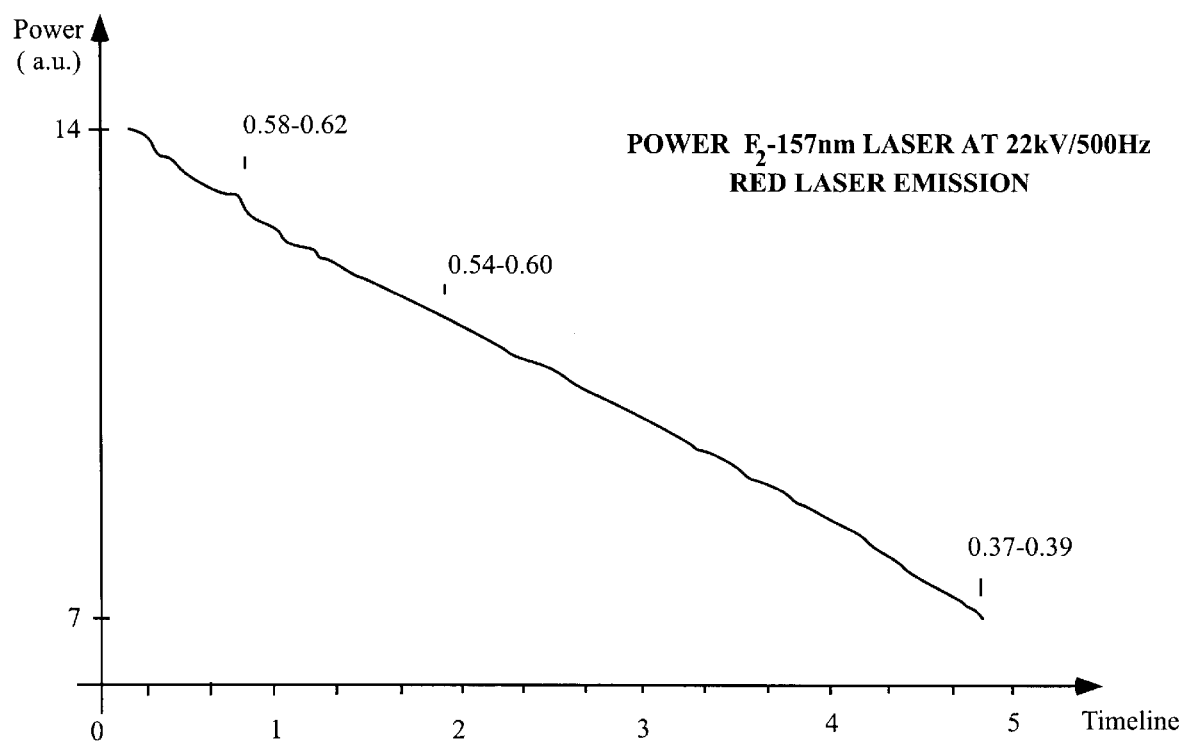
FIG. 1 shows a graph of the output power of an $F_2$ laser over time at constant input energy with three superimposed points also noting the power of the red laser emission at three different points in time during the laser's operation.

FIG. 1 shows the output power of an $F_2$-157 nm laser at constant high voltage over time and a photodetection signal (a.u.) measuring red laser emission at three different points in time during the laser's operation. The decrease in the power of the red laser emission corresponds to a decrease in the power of the laser and also the concentrations of F and $F_2$, as discussed above.

Figure 2:
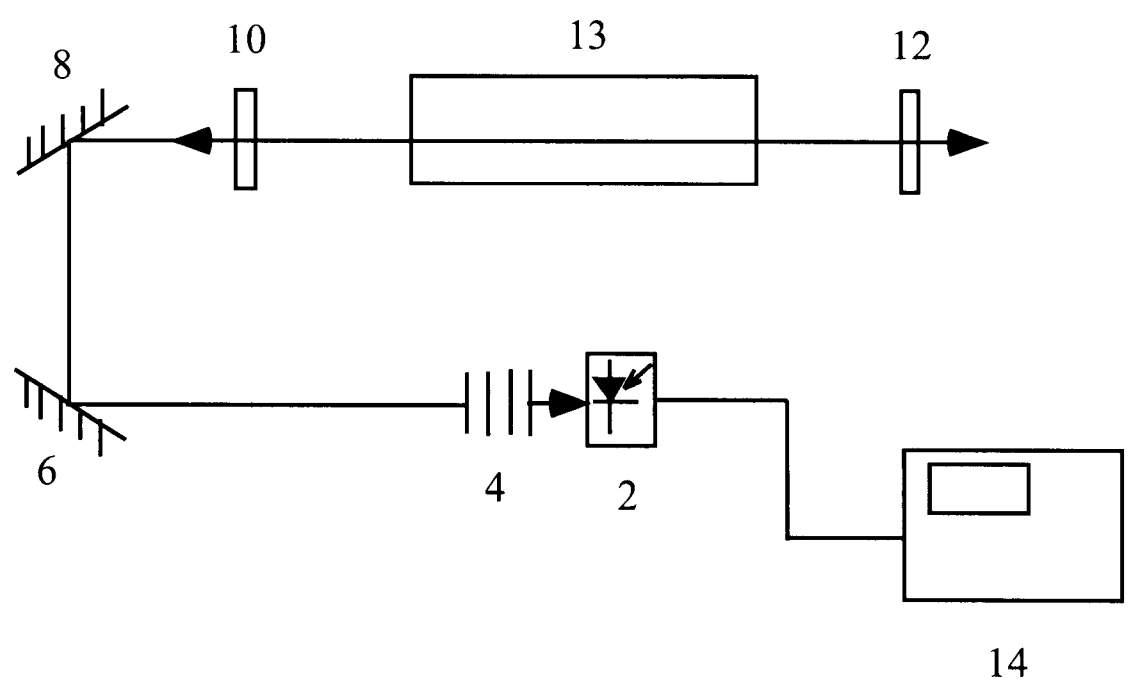
FIG. 2 shows an apparatus and method for detecting the red laser emission of a molecular fluorine laser.

FIG. 2 shows an apparatus suitable for detecting the red laser emission of an $F_2$ laser. Mirrors 10 and 12 define a resonant cavity surrounding the gas discharge chamber 13 which houses the lasing gas mixture. Mirror 10 at one end of the laser resonator is highly reflective at the 157 nm wavelength but is highly transmissive for red visible light. Accordingly, the photodiode 2 can be placed on an optical path behind mirror 10 as shown in the figure. The signal from the photodiode may be read from a readout unit 14 attached thereto.

An attenuator 4 can be placed in front of photodiode 2 to reduce the power reaching the detector. Mirrors 6 and 8 which complete the optical path to the detector are shown for convenience.

After the five hour run of the laser as shown in FIG. 1 the laser was left standing for over 14h. After the laser was switched back on, the signal from the photodiode for the red laser emission was between 0.34 and 0.35 (a.u.). Two $F_2$-injections increased the signal back to 0.57. A first halogen injection of 10 mbar $F_2$/Ne (5% $F_2$) increased the red emission signal to 0.44–0.47. A second halogen injection of 10 mbar $F_2$/Ne (5% $F_2$) increased the red emission signal to 0.54–0.57.

As this experiment demonstrates, there is a direct relationship between the power of the red emission signal and the concentration of $F_2$ in the discharge chamber. This relationship is such that the power of the red emission signal increases smoothly with $F_2$ concentration. Consequently, the photodiode readout unit 14 gives a measurement that is indicative of the $F_2$ concentration. It is also possible to develop a calibration curve to allow the photodiode red emission signal to be readily translated into a measure of $F_2$ concentration. Such a calibration may be carried out by plotting the power of the red emission signal as a function of known $F_2$ concentration. The $F_2$ concentration is known, for example, when the gas discharge chamber has recently been filled with a gas mixture of known composition and there has not been sufficient time for any significant halogen depletion to occur.

Once the strength of the red emission signal has been measured, such information may be fed into a computer control means for maintaining the concentration of molecular fluorine gas within a desired range. An example of such a computer control means is described in U.S. patent application Ser. No. 09/379,034 incorporated herein by reference in its entirety. Such computer control means may compare the value it receives concerning the strength of the red emission signal against a reference value and if a sufficient deviation is found may cause an injection of $F_2$ gas into the gas discharge chamber to occur from a gas supply placed near the molecular fluorine laser for this purpose. In such a manner, the concentration of $F_2$ gas in the gas discharge chamber may be maintained within a desired range by the control means. The reference value used by the control means may be chosen to reflect the strength of the red emission signal when the $F_2$ gas concentration is optimal. The extent of the deviation from the reference value which will trigger an $F_2$ gas replenishment may be chosen to reflect the width of the range in which it is desired to maintain the $F_2$ gas concentration. When it is desired to maintain the $F_2$ gas concentration within a narrow range, "micro-injections" of $F_2$ gas may be used as taught in U.S. patent application Ser. No. 09/447,882 incorporated herein by reference in its entirety.

The scope of the present invention is meant to be that set forth in the claims that follow, and equivalents thereof, and is not limited to any of the specific embodiments described above.

What is claimed is:

1. A method of regulating the concentration of molecular fluorine gas in a gas mixture present in a discharge chamber of a gas discharge laser within a desired range, comprising the steps of:

energizing said gas mixture to generate a laser radiation spectrum;

optically separating a red light emission from the rest of said laser radiation spectrum;

measuring the power of said red light emission whereby the molecular fluorine concentration in said gas mixture may be estimated; and delivering molecular fluorine gas into the discharge chamber in an amount at least partially dependent on said measurement of said power of said red light emission so as to maintain the concentration of molecular fluorine gas within said desired range.

2. The method as recited in claim 1 wherein said gas discharge laser is a molecular fluorine laser whose characteristic emission occurs around 157 nm.

3. The method as recited in claim 1, wherein said red light emission occurs around 635 nm, 745 nm, and 755 nm.

4. The method as recited in claim 1 wherein said step of optically separating said red light emission includes using a mirror that has a high reflectance around 157 nm and a low reflectance to red light.

5. The method as recited in claim 1 or claim 4 wherein said step of measuring said power of said red light emission includes using a photodiode.

6. A gas discharge laser system for regulating the concentration of molecular fluorine gas in a gas mixture present in a discharge chamber within a desired range, comprising:

a discharge chamber containing a gas mixture including molecular fluorine gas;

electrodes for energizing said gas mixture to generate a laser radiation spectrum;

a resonator for optically resonating at least a portion of said laser radiation spectrum along an optical path;

optical means for separating a red light emission from the rest of said laser radiation spectrum;

a detector for measuring the power of said red light emission whereby the molecular fluorine concentration in said gas mixture may be estimated; and control means for delivering molecular fluorine gas into the discharge chamber in an amount at least partially dependent on said measurement of said power of said red light emission so as to maintain the concentration of molecular fluorine gas within said desired range.

7. The laser system as recited in claim 6 wherein said gas discharge laser is a molecular fluorine laser whose characteristic emission occurs around 157 nm.

8. The laser system as recited in claim 6 wherein said red light emission occurs around 635 nm, 745 nm, and 755 nm.

9. The laser system as recited in claim 6 wherein said optical means for separating said red light emission includes a mirror that has a high reflectance around 157 nm and a low reflectance to red light.

10. The laser system as recited in claim 6 or claim 9 wherein said detector for measuring said power of said red light emission includes a photodiode.

* * * * *